United States Patent
Holm et al.

(10) Patent No.: US 6,785,755 B1
(45) Date of Patent: Aug. 31, 2004

(54) GRANT REMOVAL VIA DUMMY MASTER ARBITRATION

(75) Inventors: Jeffrey J. Holm, Eden Prairie, MN (US); Judy M. Gehman, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 636 days.

(21) Appl. No.: 09/822,665

(22) Filed: Mar. 30, 2001

(51) Int. Cl.$^7$ ............................................. G06F 13/00
(52) U.S. Cl. ...................................................... 710/110
(58) Field of Search ........................ 710/36, 100, 107, 710/110, 113, 240, 241; 714/1, 43, 798, 799, 811

(56) References Cited

U.S. PATENT DOCUMENTS

| | | | | |
|---|---|---|---|---|
| 4,257,095 A | * | 3/1981 | Nadir .......................... | 710/119 |
| 5,349,690 A | * | 9/1994 | Frame et al. ............... | 710/107 |
| 5,555,382 A | * | 9/1996 | Thaller et al. .............. | 710/113 |
| 5,613,075 A | * | 3/1997 | Wade et al. ................. | 710/107 |
| 5,872,937 A | * | 2/1999 | Jaramillo .................... | 710/107 |

OTHER PUBLICATIONS

AMBA™ Specification (Rev. 2.0), 1999, 1–1 through 6–38.

* cited by examiner

Primary Examiner—Xuan M. Thai
(74) Attorney, Agent, or Firm—Christopher P. Maiorana, P.C.

(57) ABSTRACT

A system for controlling arbitration that may be used for a bus. The system generally comprises a bus, at least one master, and a first circuit coupled between the bus an the at least one master. The at least one master may be configured to present at least one transfer signal. The first circuit may be configured to (i) grant a bus mastership to a first master of the at least one master, (ii) present a first transfer signal of the at least one transfer signal to the bus in response to granting the bus mastership to the first master, (iii) remove the bus mastership from all masters of the at least one master, and (iv) present an idle transfer signal to the bus in response to removing the bus mastership from all masters.

20 Claims, 4 Drawing Sheets

GRANT REMOVAL VIA DUMMY MASTER ARBITRATION

FIELD OF THE INVENTION

The present invention relates to a method and/or architecture for bus arbitration generally and, more particularly, to bus arbitration when all masters are unable to use the bus.

BACKGROUND OF THE INVENTION

An Advanced Microcontroller Bus Architecture (AMBA) specification defines on-chip communications standards for microcontrollers. The AMBA specification is being used worldwide by a variety of application specific integrated circuit vendors. The AMBA is being used in wireless, telecommunications, networking, office automation, and storage applications. The AMBA specification defines three busses, an Advanced High-Performance Bus (AHB), an Advanced System Bus (ASB), and an Advanced Peripheral Bus (APB).

The AHB portion of the AMBA specification provides communications between multiple masters and multiple slaves via the AHB. A bus mastership for the AHB (the bus) is controlled by an arbiter. When a given master has the bus mastership, then the given master may initiate one or more transfers with one or more slaves. Any slave that cannot respond immediately to a transfer may issue a RETRY or a SPLIT response. The RETRY and the SPLIT responses allow the bus to be used for other purposes while the slave prepares the transfer. The given master may lock the bus mastership (i.e., a locked master) to retain control of the bus until the slave completes the transfer.

The arbiter must grant the bus mastership to a default master if a particular situation exists where none of the masters are able to use the bus (i.e., a no-master situation). The default master may be a preselected master, any master that would benefit from having a low access latency to the bus, or the locked master. The default master must have sufficient complexity to perform only IDLE transfers under the no-master situation.

Four conditions may exist in which give rise to the no-master situation. A first condition occurs when none of the masters require use of the bus and none of the masters are involved in a SPLIT transaction. A second condition where no master is able to use the bus occurs when all masters are waiting on slaves that have issued the SPLIT response. A third condition occurs when one or more masters are involved in the SPLIT response and no other master is requesting the bus mastership. Under the first, second and third conditions, the arbiter must grant the bus mastership to the preselected master or any master than may benefit from having a low access latency to the bus. A fourth condition occurs when the locked master has received the SPLIT response. Under the fourth condition, the arbiter cannot allow a different master from corrupting the locked master's lock transfer. Therefore, the arbiter must grant the bus mastership to a master that will only drive IDLE transfers during this time.

Several approaches have been proposed to simplify the no-master situation where none of the masters are able to use the bus. A first approach creates a dedicated default master that only performs IDLE transfers. The first approach is straightforward but also consumes one of the sixteen master positions available on the bus. A second approach is to modify the slaves to ignore or queue transfers under the no-master situation. The second approach deviates from the AMBA specification and thus may not coexist with AMBA-compliant masters and slaves. Furthermore, a queuing mechanism for the modified slaves to handle repeated requests from the modified masters is complicated. A third approach is to restrict transfers on the bus so that the no-master situation cannot take place. The third approach requires careful planning by design personnel. The third approach leaves room for design mistakes that can cause problems with the bus.

SUMMARY OF THE INVENTION

The present invention concerns a system for controlling arbitration that may be used for a bus. The system generally comprises a bus, at least one master, and a first circuit coupled between the bus and the at least one master. The at least one master may be configured to present at least one transfer signal. The first circuit may be configured to (i) grant a bus mastership to a first master of the at least one master, (ii) present a first transfer signal of the at least one transfer signal to the bus in response to granting the bus mastership to the first master, (iii) remove the bus mastership from all masters of the at least one master, and (iv) present an idle transfer signal to the bus in response to removing the bus mastership from all masters.

The objects, features and advantages of the present invention include providing a method and/or architecture for bus arbitration generally and, more particularly, to bus arbitration when all masters are unable to use the bus that may (i) require minor additional logic for the bus and the arbiter, (ii) provides for a maximum number of masters allowed on the bus, (iii) requires no specification deviations for the masters and the slaves, and/or (iv) ensures that third party masters and slaves will work on the bus.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
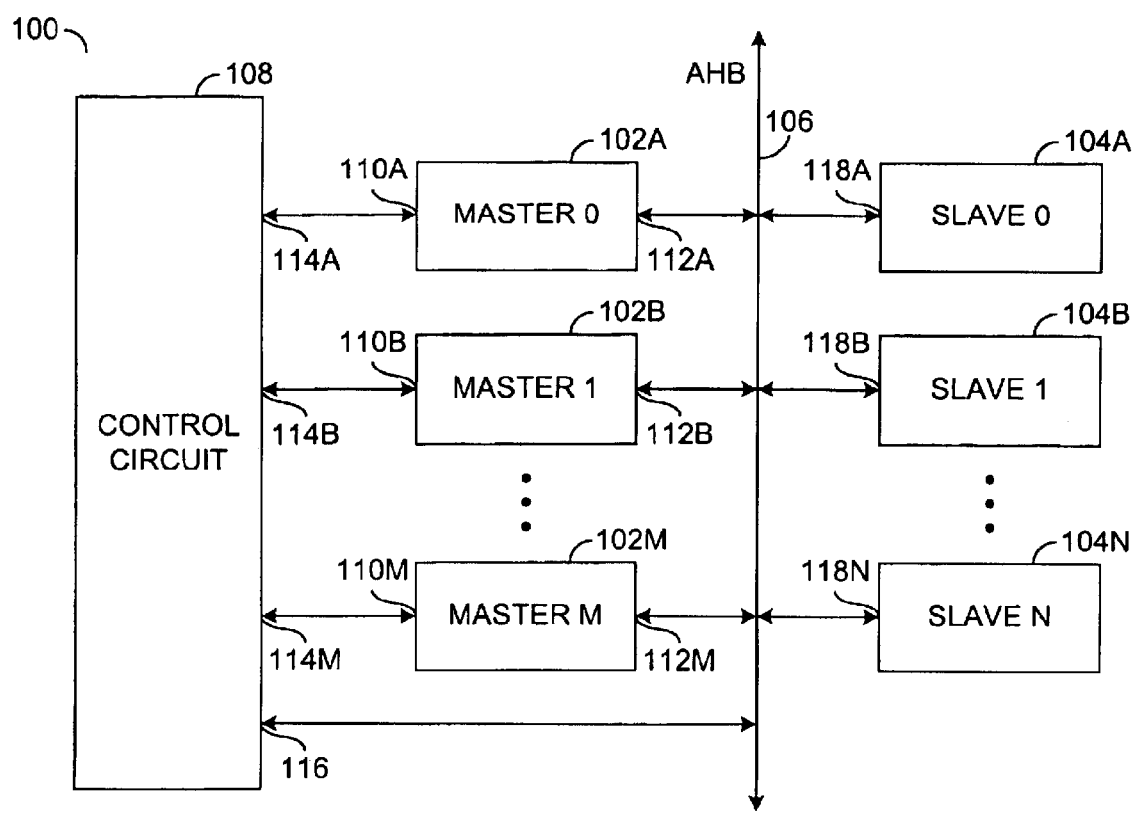
FIG. 1 is a block diagram of a bus system.

Referring to FIG. 1, a block diagram of a bus system 100 using an Advanced High-Performance Bus (AHB) is shown in accordance with a preferred embodiment of the present invention. The AHB is defined in an Advanced Microcontroller Bus Architecture (AMBA) specification (AMBA Specification Rev. 2.0, ARM Limited, Cambridge, England). The AMBA specification is herein incorporated by reference in its entirety. The present invention may be practiced with other bus specifications to meet the design criteria of a particular application.

The bus system 100 generally comprises one or more masters 102A–M, one or more slaves 104A–N, the AHB 106, and a control circuit 108. Each master 102A–M may have an interface 110A–M respectively that may present signals to and receive signals from the control circuit 108. Each master 102A–M may have an interface 112A–M respectively that may present signals to and receive signals from the AHB 106. The control circuit 108 may have interfaces 114A–M that may receive signals from and present signals to the masters 102A–M respectively. The control circuit 108 may have an interface 116 that may present signals to and receive signals from the AHB 106. Each slave 104A–N may have an interface 118A–N respectively that may present signals to and receive signals from the AHB 106.

Figure 2:
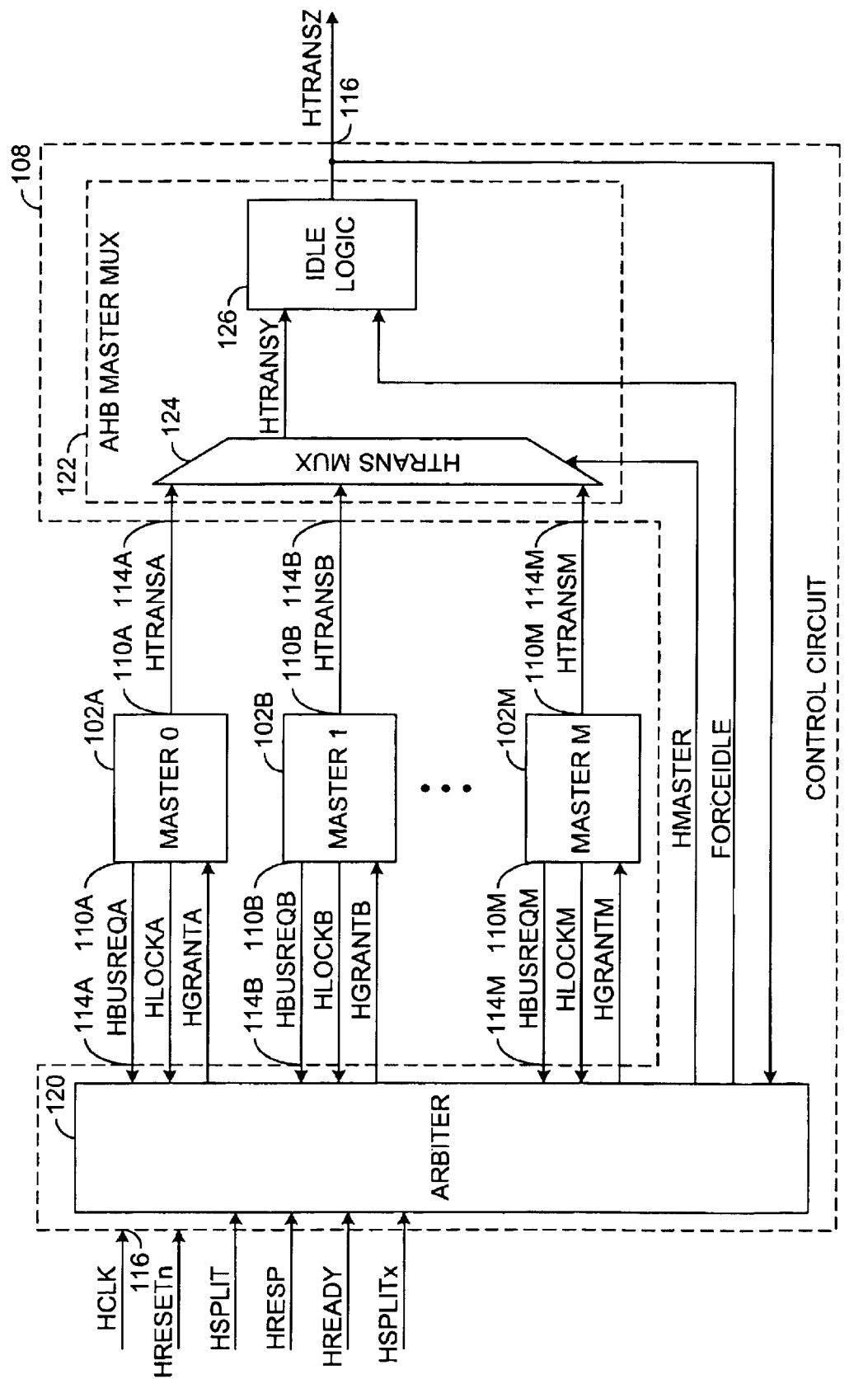
FIG. 2 is a detailed block diagram of a control circuit and masters within the bus system.

Referring to FIG. 2, a detailed block diagram of the control circuit 108 and the masters 102A–M is shown in accordance with a preferred embodiment of the present invention. The control circuit 108 generally comprises an arbiter 120 and an AHB master multiplexer 122. The AHB master multiplexer 122 may include an HTRANS multiplexer 124 and an idle logic 126.

The arbiter 120 may receive a signal (e.g., HBUSREQp, where p may range from A–M) from each of the masters 102A–M respectively. The arbiter 120 may receive another signal (e.g., HLOCKp, where p may range from A–M) from each of the masters 102A–M respectively. The arbiter 120 may present a signal (e.g., HGRANTp, where p may range from A–M) to each of the masters 102A–M respectively.

The arbiter 120 may present a signal (e.g., HMASTER) to the HTRANS multiplexer 124. The arbiter 120 may present another signal (e.g., FORCEIDLE) to the idle logic 126. The arbiter 120 may receive a signal (e.g., HTRANSZ) from the idle logic 126. The HTRANS multiplexer 124 may present a signal (e.g., HTRANSY) to the idle logic 126. The idle logic 126 may present the signal HTRANSZ to the AHB 106 and the arbiter 120.

The control circuit 108 may receive a clock signal (e.g., HCLK) and multiple signals (e.g., HRESETn) from the AHB 106. The arbiter 120 may receive several signals (e.g., HRESP, HREADY and HSPLITx, where x may range from A–N) from the AHB 106. Other signals (not shown) that may be presented to and from the arbiter 120, the masters 102A–M, and the slaves 104A–N may be found in the AMBA specification.

The signals HBUSREQp may serve as bus mastership requests presented by the masters 102A–M. The signals HLOCKp may serve as bus mastership locks presented by the masters 102A–M. Each signal HGRANTp may serve as a bus mastership grant/remove indicator received by the masters 102A–M.

The signal HMASTER may serve to identify by number which one of the masters 102A–M has the bus mastership. The signal FORCEIDLE may serve as a force/not-force idle command. The signal HTRANSY may serve as an internal transfer message. The signal HTRANSY is generally selected from among the signals HTRANSp (where p may range from A–M) as determined by the signal HMASTER. The signal HTRANSZ may service as a final transfer message presented to the AHB 106.

The signal HCLK may serve as a clock signal. The signal HRESETn may serve as a reset signal. The signal HRESP may serve as a response message from the slaves 104A–N. The signal HREADY may serve as a ready indication presented by the slaves 104A–N when ready to complete a transfer. The signals HSPLITx may serve as an indication that the slave 104A–N is ready to complete the SPLIT response and as an indication of which one of the master 102A–M is involved with the SPLIT response.

Figure 3:
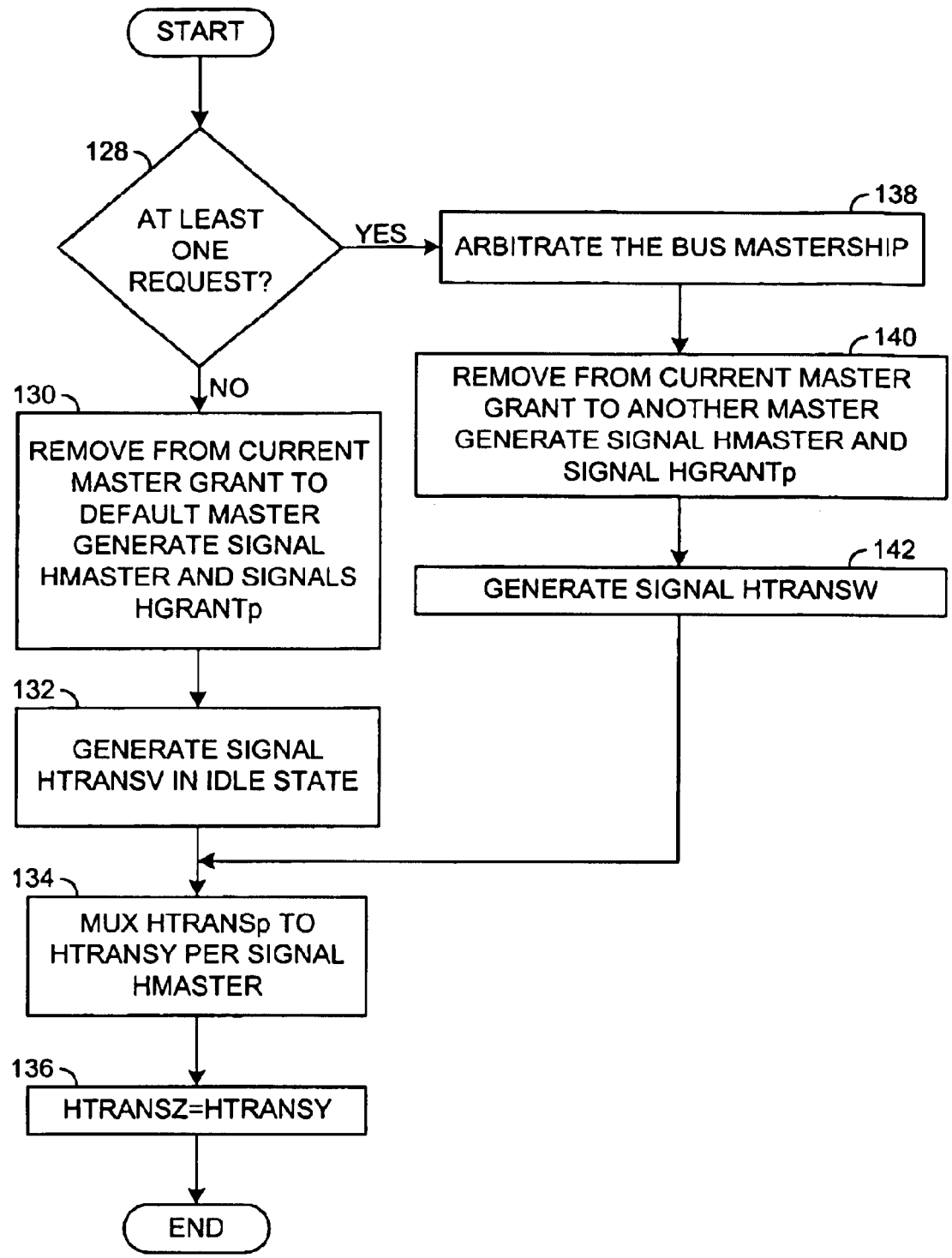
FIG. 3 is a flow diagram of a method for granting and removing a bus mastership.

Referring to FIG. 3, a flow diagram of a method for granting and removing the bus mastership is shown in accordance with a preferred embodiment of the present invention. The arbiter 120 generally checks the signals HBUSREQp (e.g., decision block 128) to determine if at least one of the masters 102A–M is requesting the bus mastership. If none of the masters 102A–M are requesting the bus mastership (e.g., the NO branch of decision block 128), then the arbiter 120 may change the bus mastership allocation (e.g., block 130) to a default master 102V (where V may be one of A–M). The default master 102V is generally preselected from the masters 102A–M. Changing the bus mastership allocation generally involves removing the bus mastership from one master 102A–M and granting the bus mastership to another master 102A–M. The arbiter 120 may inform the masters 102A–M of the bus mastership change through the signals HGRANTp. The arbiter 120 may inform the HTRANS multiplexer 124 of the bus mastership change through the signal HMASTER.

The default master 102V is generally required by the AMBA specification to present the signal HTRANSV in an IDLE state upon receipt of an unrequested bus mastership (e.g., block 132). The HTRANS multiplexer 124 may multiplex the signal HTRANSV to the signal HTRANSY as selected by the signal HMASTER (e.g., block 134). The idle logic 126 may set the signal HTRANSZ equal to the signal HTRANSY and present the signal HTRANSZ to the AHB 106 (e.g., block 136). The signal HTRANSZ in the IDLE state may also be referred to as an idle transfer signal.

If at least one of the masters 102A–M requests the bus mastership (e.g., the YES branch of decision block 128), then the arbiter 120 generally arbitrates granting of the bus mastership (e.g., block 138). The arbiter 120 may remove the bus mastership from one of the masters 102A–M and grant the bus mastership to a granted master 102W (where W may be one of A–M) selected from among the requesting masters 102A–M. (e.g., block 140). The signals HGRANTp and HMASTER may also be updated accordingly. The granted master 102W may then generate and present the signal HTRANSW (e.g., block 142). The HTRANS multiplexer 124 may multiplex the signal HTRANSW into the signal HTRANSY (e.g., block 134). The idle logic 126 may set the signal HTRANSZ equal to the signal HTRANSY and present the signal HTRANSZ (now equal to the signal HTRANSW) to the AHB 106 (e.g., block 136).

The present invention handles situations in the bus system 100 where all of the masters 102A–M are unable to use the AHB 106 (e.g., a no-master situation) even though at least one of the masters 102A–M may be requesting the bus mastership. Rather than adding additional complexity into the default master 102V or using up one of the maximum of 16 masters 102A–M for a dummy idle-transfer-only master 102, the present invention creates what appears to be a 17th master to control the AHB 106 without violating the spirit of the AMBA specification. The 17th master is generally referred to as a dummy master. The dummy master is a virtual master and thus does not appear in FIG. 1 or FIG. 2.

The arbiter 120 may assert the signal FORCEIDLE when no other masters 102A–M are allowed to be granted the bus (e.g., the no-master situation). The no-master situation generally occurs when the granted master 102W is involved with the SPLIT response and there are not any other masters 102A–M requesting the bus mastership. The other masters 102A–M may not be requesting the bus mastership because each is (i) involved with another SPLIT response or (ii) may not want the bus mastership. The no-master situation can also happen when the granted master 102W has locked the bus mastership and receives the SPLIT response. While the signal FORCEIDLE is active, none of the other signals HGRATp of the arbiter 120 will be in the active state. Since none of the signals HGRANTp are used to signal the no-master situation, the bus system 100 may have 16 masters 102A–M (instead of 15 masters 102A–L plus one dummy master)

The signal FORCEIDLE may be an input signal to the AHB master multiplexer 122. The AHB master multiplexer 122 generally has some additional logic that may present the idle transfer signal (e.g., the signal HTRANSZ in the IDLE state) when the signal FORCEIDLE is active. The signal FORCEIDLE may have the same timing as other master control signals. For example, the signal FORCEIDLE may be registered with the signal HREADY before driving the signal HTRANSZ to the IDLE state.

Figure 4:
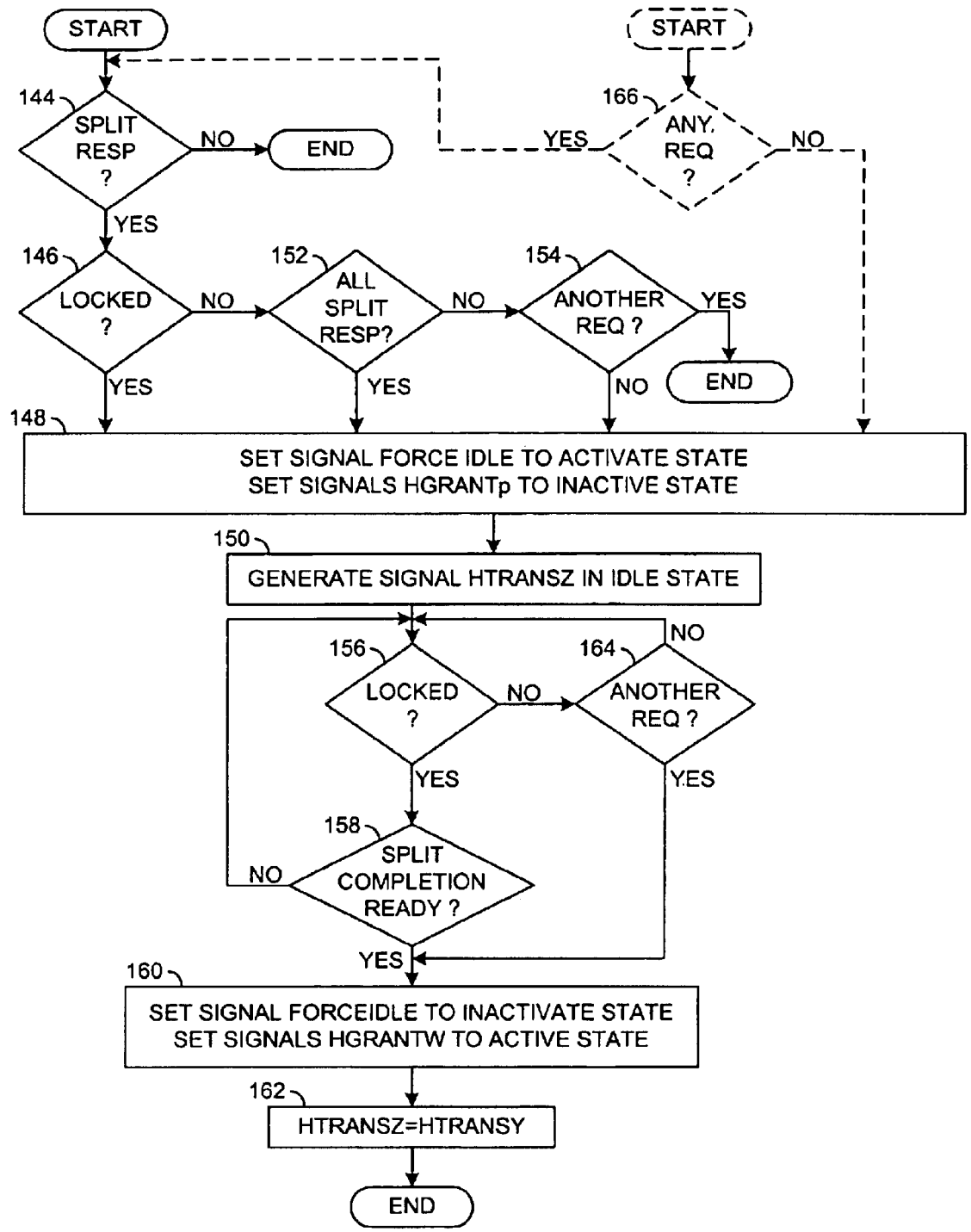
FIG. 4 is a flow diagram of a grant removal via a dummy master arbitration.

Referring to FIG. 4, a flow diagram of a method for generating a grant removal via a dummy master arbitration is shown in accordance with a preferred embodiment of the present invention. The arbiter 120 generally monitors the AHB 106, the signals HTRANSZ, the signal HRESP, the signals HSPLITx, and the signals HBUSREQp for the no-master situation. The arbiter 120 may monitor the AHB 106 to detect if the granted master 102W receives the SPLIT response (e.g., decision block 144) from a split slave 104W in response to the signal HTRANSZ. If the granted master 102W is not involved in the SPLIT response (e.g., the NO branch of decision block 144), then the arbiter 120 takes no action to grant the bus mastership to the dummy master (e.g., END).

If the granted master 102W is involved in the SPLIT response (e.g., the YES branch of decision block 144), then the arbiter 120 may mask the signal HBUSREQW and check if the granted master 102W has locked the bus mastership (e.g., decision block 146). If the granted master 102W is involved in the SPLIT response and has locked the bus mastership (e.g., the YES branch of decision block 146), then the arbiter 120 may set the signal FORCEIDLE in an active state (e.g., block 148). The arbiter 120 may also set the signals HGRANTp in an inactive state (e.g., block 148). The idle logic 126 generally responds to the signal FORCEIDLE in the active state by generating and presenting the signal HTRANSZ in the IDLE state (e.g., block 150). Here, the dummy master appears to be driving the idle transfer signal on the AHB 106.

If the granted master 102W is involved in the SPLIT response and has not locked the bus mastership (e.g., the NO branch of decision block 146), then the arbiter 120 may check if all the masters 102A–M are involved in SPLIT responses (e.g., decision block 152). If all of the masters 102A–M are involved in SPLIT responses (e.g., the YES branch of decision bock 152), then the arbiter 120 may set the signal FORCEIDLE in the active state and the signals HGRANTp in the inactive state(e.g., block 148). Again, the idle logic 126 responds to the signal FORCEIDLE in the active state by generating and presenting the signal HTRANSZ in the IDLE state.

If not all of the masters 102A–M are involved in SPLIT responses (e.g., the NO branch of decision block 152), then the arbiter 120 may perform another check. The arbiter 120 may check if any of the masters 102A–M not involved in SPLIT responses are requesting the bus mastership (e.g., decision block 154). If at least one master 102A–M not involved in SPLIT responses is requesting the bus mastership (e.g., the YES branch of decision block 154), then the arbiter 120 may take no further action to grant the bus mastership to the dummy master (e.g., END). Here, the arbiter 120 may grant the bus mastership to the at least one master 102A–M requesting the bus mastership and not involved in SPLIT responses instead of the dummy master. If none of the masters 102A–M not involved in SPLIT responses are requesting the bus mastership (e.g., the NO branch of decision block 154), then the arbiter 120 may set the signal FORCEIDLE in the active state and set the signals HGRANTp in the inactive state (e.g., block 148). Again, the idle logic 126 generally responds to the signal FORCEIDLE in the active state by generating and presenting the signal HTRANSZ in the IDLE state.

Once the signal HTRANSZ has been forced into the IDLE state (e.g., block 150), the arbiter 120 may check if the granted master 102W is still locking the bus mastership (e.g., decision block 156). If the granted master 102W is still locking the bus mastership (e.g., the YES branch of decision block 156), then the arbiter 120 may check the signal HSPLITx presented by the split slave 104W (e.g., decision block 158). If the split slave 104W is not ready to complete the transfer (e.g., the NO branch of decision block 158), then the arbiter 120 generally waits for a next cycle of the AHB 106 and checks again. If the split slave 104W is ready for the granted master 102W to complete the SPLIT transfer (e.g., the YES branch of decision block 158), then the arbiter 120 may unmask the signal HBUSREQW. The arbiter 120 may then set the signal FORCEIDLE in an inactive state and set the signal HGRANTW in the active state (e.g., block 160). The idle logic 126 generally responds to the signal FORCEIDLE in the inactive state by setting the signal HTRANSZ equal to the signal HTRANSY (e.g., block 162). In other words, the bus mastership has been effectively removed from the dummy master.

If the bus mastership is not locked after the idle logic 126 has presented the signal HTRANSZ in the IDLE state (e.g., the NO branch of decision block 156), then the arbiter 120 may perform additional checks. The arbiter 120 may check for receipt of unmasked requests for the bus mastership (e.g., decision block 164). If there are no unmasked requests for the bus mastership (e.g., the NO branch of decision block 164), then the arbiter 120 generally waits for the next cycle of the AHB 106 to check again. If there is at least one unmasked request for the bus mastership (e.g., the YES branch of decision block 164), then the arbiter 120 generally sets the signal FORCEIDLE in the inactive state and sets the signal HGRANTW in the active state (e.g., block 160).

In an alternative embodiment, the arbiter 120 may optionally initially check if at least one master 102A–M is requesting the bus mastership (e.g., decision block 166). If at least one of the masters 102A–M is requesting the bus mastership (e.g., the YES branch of decision block 166), then the arbiter 120 may monitor the AHB 106 to detect if the granted master 102W receives the SPLIT response (e.g., decision block 144). If none of the masters 102A–M are requesting the bus mastership (e.g., the NO branch of decision block 166), then the idle then the arbiter 120 may set the signal FORCEIDLE in the active state and set the signals HGRANTp in the inactive state (e.g., block 148). Here, the default master 102V may not be required to present the signal HTRANSV in the idle state to the HTRANS multiplexer 124 since the idle logic 126 presents the signal HTRANSZ in the IDLE state to the AHB 106.

Many variations for the bus system 100 are possible within the scope of the present invention. For example, the signal FORCEIDLE may be presented on one or more wires. Any wire or combination of wires that signals the no-master situation may be sufficient. The signal FORCEIDLE may be generated and presented by a circuit other than the arbiter 120. The AHB 106 may be another bus conforming to another standard. The bus may be non-multiplexed. The idle logic 126 may be integrated into the default master 102V with the signal FORCEIDLE informing the default master 102V when to present the signal HTRANSV in the IDLE state. The signal FORCEIDLE may be used to impact other AHB signals relating to address, size, priority, writes, bursts, and so on. For example, the signal FORCEIDLE may alter an address signal to ensure that a default slave responds to the signal HTRANSZ in the IDLE state.

The various signals of the present invention are generally "on" (e.g., a digital HIGH, active, asserted, or 1) or "off" (e.g., a digital LOW, inactive, de-asserted, or 0). However, the particular polarities of the on (e.g., asserted) and off (e.g., de-asserted) states of the signals may be adjusted (e.g., reversed) accordingly to meet the design criteria of a particular implementation.

The function performed by the flow diagrams of FIG. 3 and FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A system comprising:
   a bus;
   at least one master configured to present at least one transfer signal; and
   a first circuit coupled between said bus and said at least one master, said first circuit configured to (i) grant a bus mastership to a first master of said at least one master, (ii) present a first transfer signal of said at least one transfer signal received from said first master to said bus in response to granting said bus mastership to said first master, wherein said first transfer signal is different than an idle transfer signal, (iii) remove said bus mastership from all masters of said at least one master, and (iv) present said idle transfer signal to said bus in response to removing said bus mastership from said all masters.

2. The system according to claim 1, wherein (i) said first circuit is further configured to detect when zero masters of said at least one master are able to use said bus and (ii) removing said bus mastership from said all masters is done in response to detecting when said zero masters are able to use said bus.

3. The system according to claim 2, wherein detecting when said zero masters are able to use said bus is detecting when each of said at least one master is simultaneously involved in a split response.

4. The system according to claim 2, wherein detecting when said zero masters are able to use said bus is detecting when said first master has locked said bus mastership and said first master is involved in a split response.

5. The system according to claim 2, wherein detecting when said zero masters are able to use said bus is detecting when said first master is involved in a split response and no other masters of said at least one master is requesting said bus mastership.

6. The system according to claim 2, wherein detecting when said zero masters are able to use said bus is detecting when none of said at least one master is requesting said bus mastership.

7. The system according to claim 1, wherein said at least one master is a plurality of masters.

8. The system according to claim 7, wherein said first circuit comprises:
   an arbiter configured to present a master signal identifying said first master of said plurality of masters; and
   a second circuit configured to multiplex a plurality of said at least one transfer signals received from said plurality of masters responsive to said master signal to present said first transfer signal to said bus.

9. The system according to claim 8, wherein (i) said arbiter is further configured to present a control signal and (ii) said second circuit is further configured to present one of said first transfer signal and said idle transfer signal to said bus responsive to said control signal.

10. The system according to claim 9, wherein said first circuit is further configured to detect when (i) (a) said all masters are simultaneously involved in a split response, (i) (b) said first master has locked said bus mastership and is involved in a split response, (i) (c) said first master is involved in said split response an and no other master of said at least one master is requesting said bus mastership, and (i) (d) none of said at least one master is requesting said bus mastership, and (ii) removing said bus mastership from said all masters is performed in response to detecting at least one of (i) (a), (i) (b), (i) (c) and (i) (d).

11. A method of operating a bus comprising the steps of:
   (A) granting a bus mastership to a first master of at least one master;
   (B) presenting a first transfer signal of at least one transfer signal generated by said first master to said bus in response to step (A), wherein said first transfer signal is different than an idle transfer signal;
   (C) removing said bus mastership from all masters of said at least one master; and
   (D) presenting said idle transfer signal to said bus in response to step (C).

12. The method according to claim 11, further comprising the step of detecting when zero masters of said at least one master are able to use said bus, wherein said removing said bus mastership of step (A) is performed in response to detecting said zero masters are able to use said bus.

13. The method according to claim 12, wherein said detecting when said zero masters are able to use said bus is detecting when said all masters are simultaneously involved in a split response.

14. The method according to claim 12, wherein said detecting when said zero masters are able to use said bus is detecting when said first master has locked said bus mastership and is involved in a split response.

15. The method according to claim 12, wherein said detecting when said zero masters are able to use said bus is detecting when said first master is involved in a split response and no other master of said at least one master is requesting said bus mastership.

16. The method according to claim 12, wherein said detecting when said zero masters are able to use said bus is detecting when none of said at least one master is requesting said bus mastership.

17. The method according to claim 11, wherein said at least one master is a plurality of masters, the method further comprising the steps of:

presenting a master signal identifying said first master of said plurality of masters;

multiplexing a plurality of said at least one transfer signals received from said plurality of masters in response to said master signal; and presenting said first transfer signal to said bus in response to multiplexing said plurality of said transfer signals.

18. The method according to claim 17, further comprising the steps of:

presenting a control signal; and presenting one of said first transfer signal and said idle transfer signal to said bus in response to said control signal.

19. The method according to claim 17, further comprising the steps of:

multiplexing said plurality of said at least one transfer signals in response to said master signal;

presenting said first signal in response to multiplexing said plurality of said at least one transfer signals;

generating said idle transfer signal; and presenting one of said idle transfer signal and said first transfer signal to said bus in response to said control signal.

20. A system comprising:

means for granting a bus mastership to a first master of at least one master;

means for presenting a first transfer signal of at least one transfer signal generated by said first master to said bus in response to granting said bus mastership to said first master, wherein said first transfer signal is different than an idle transfer signal;

means for removing said bus mastership from all masters of said at least one master; and means for presenting said idle transfer signal to said bus in response to removing said bus mastership from said all masters.

* * * * *